United States Patent Office.

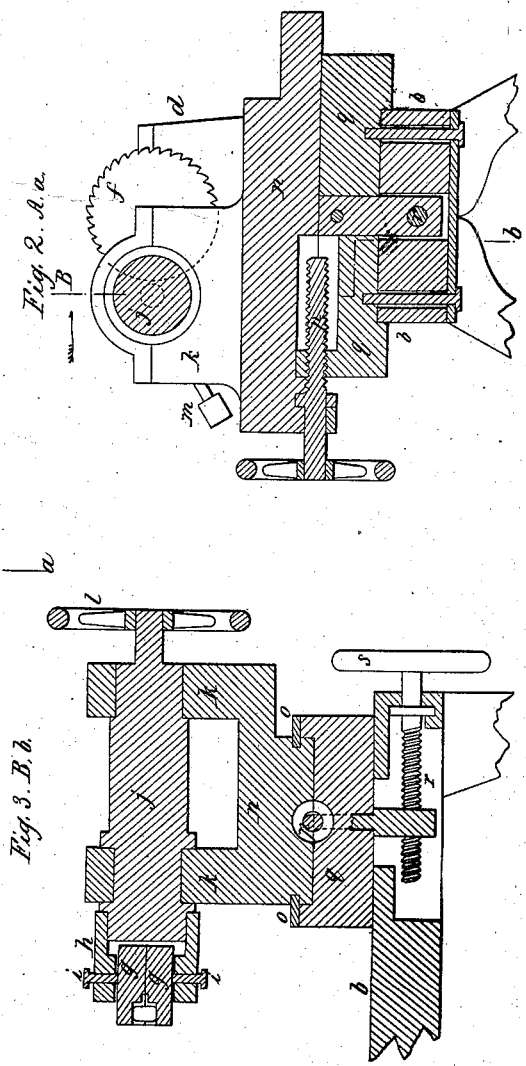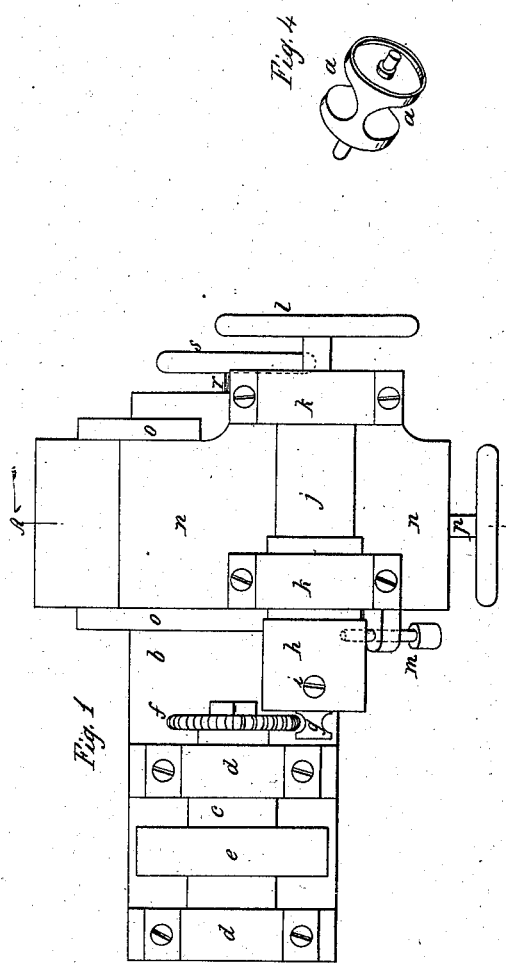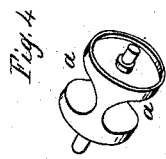

LEWIS W. SPENCER, OF NEW YORK, N. Y., ASSIGNOR TO "SCHREIBER CORNET MANUFACTURING COMPANY," OF THE SAME PLACE.

Letters Patent No. 63,819, dated April 16, 1867.

---

IMPROVEMENT IN MACHINES FOR CUTTING THE WIND PASSAGES IN THE ROTARY VALVES OF CORNETS.

---

*The Schedule referred to in these Letters Patent and making part of the same.*

---

TO ALL WHOM IT MAY CONCERN:

Be it known that I, LEWIS W. SPENCER, of the city, county, and State of New York, have invented a new and useful Machine for Cutting the Wind Passages in the Rotating Valves of Cornets and other like musical instruments; and I do hereby declare that the following is a full, clear, and exact description thereof, reference being had to the accompanying drawings, making part of this specification, in which—

Figure 1 is a plan.

Figure 2, a cross vertical section taken at the line A $a$ of fig. 1.

Figure 3, a longitudinal vertical section taken at the line B $b$ of fig. 2; and Figure 4 is a perspective view of a valve drawn on a larger scale.

The same letters indicate like parts in all the figures.

My said invention is for the purpose of cutting the two wind passages $a\ a$, in the valve represented in fig. 4 of the accompanying drawings, such valves being first turned of a cylindrical form with a journal at each end.

In the accompanying drawings, $b$ represents a suitable bench, and $c$ a mandrel, mounted in two puppets, $d\ d$, and provided with a pulley, $e$, to be driven by a belt. To the front end of the mandrel is secured a burr cutter-wheel, $f$, whose cutting periphery in cross-section is to be of a semicircular form, the reverse of the form of the wind passage to be cut, and as the valves to be made are of various sizes the mandrel must be so formed as to admit of changing the cutters. The cylindrical block of metal, or blank in which the wind passages are to be cut, is secured in a pair of jaws, $g\ g$, fitted in a mortise in the end of a chuck, $h$, provided with set-screws, $i\ i$, that operate on the jaws to gripe the blank. As the valves to be made vary in size, and the jaws must gripe both ends of the cylindrical blank that the cutter may have free access to it between the parts griped, and it is important that the parts so griped should not be injured, the griping part of the jaws must be in the form of hollow cylinders corresponding in size with the blank to be griped; hence there must be one set of jaws for each size of valves to be made, and they and the chuck must be so formed that the jaws can be readily taken out and replaced. The mode of construction represented I have found to answer a good purpose. The chuck $h$ is secured to one end of an arbor, $j$, mounted in two puppets, $k\ k$, so that it can be turned by a hand-wheel, $l$, on the outer end of it. The chuck has two holes on opposite sides to receive a securing pin, $m$. When the securing pin is inserted in one of the holes the jaws will be in a position to present the blank to the cutter to cut one of the wind passages, and when the chuck is turned half a revolution and the pin inserted in the other hole the blank will be in the required position to cut the other passage. The puppets $k\ k$ of the arbor $j$ are mounted in a carriage, $n$, adapted to slide in ways, $o\ o$, at right angles to the axis of the mandrel, and operated by a screw, $p$, provided with a hand-wheel in manner well known to machinists, and this is for the purpose of moving the blank up to the burr cutter-wheel, until the required depth of cut has been obtained, and then to draw it back that the chuck may be turned to present the other side. And as the valves are of various lengths, requiring a longitudinal adjustment, the ways $o\ o$ for the carriage $n$ are formed in the upper part of another carriage, $q$, fitted to slide on the bench $b$, in a direction parallel with the axis of the mandrel, which is effected in the usual way by means of a screw, $r$, and hand-wheel $s$.

Having thus described my said invention, and the mode of construction which I have found to answer a good purpose, what I claim as my invention, and desire to secure by Letters Patent, is—

The combination of the mandrel with its burr cutter, the chuck capable of being turned and held in position, and provided with griping jaws, substantially such as described, and the two carriages capable of being moved at right angles the one with the other, substantially as and for the purpose described.

L. W. SPENCER.

Witnesses:
W. H. BISHOP,
ANDREW DE LACY.